United States Patent [19]

Kallai et al.

[11] 4,182,508
[45] Jan. 8, 1980

[54] BICYCLE SEAT SUPPORTING MEANS

[75] Inventors: Charles Kallai; Valerie Kallai; Charles Kallai, Jr., all of Woodbridge, Canada

[73] Assignee: Hamilton Mould Tool & Die Limited, Weston, Canada

[21] Appl. No.: 871,633

[22] Filed: Jan. 23, 1978

[51] Int. Cl.$^2$ ............................................. B62J 1/02
[52] U.S. Cl. .................................. 267/132; 74/527; 280/283; 297/209; 403/108
[58] Field of Search ............... 267/131, 132, 133, 175, 267/176, 177, 178; 248/399, 401, 402; 74/527; 188/300; 280/283, 284; 297/205, 209; 403/108, 378, 379

[56] References Cited

U.S. PATENT DOCUMENTS

| 642,606 | 2/1900 | Haider | 280/283 |
| 886,227 | 4/1908 | Mamet et al. | 248/402 |
| 2,639,760 | 5/1953 | Szilagyi | 297/209 |
| 2,675,256 | 4/1954 | Cornell | 403/379 |
| 2,744,801 | 5/1956 | Granberry et al. | 403/378 |
| 3,466,086 | 9/1969 | James et al. | 297/209 |

FOREIGN PATENT DOCUMENTS

| 34431 | 4/1925 | Denmark | 280/283 |
| 29611 | 9/1925 | France | 280/283 |
| 414365 | 7/1946 | Italy | 280/283 |
| 495356 | 11/1938 | United Kingdom | 280/283 |

*Primary Examiner*—Edward R. Kazenske
*Attorney, Agent, or Firm*—Hirons, Rogers & Scott

[57] ABSTRACT

A bicycle seat support comprises an outer tubular member and an inner tubular member telescopically slidable therein, the inner tubular member protruding from the open upper end of the outer tubular member and having the bicycle seat clamped thereto. A compression spring is located within the outer tubular member to urge the inner tubular member upwards and resiliently resist downward movement of the inner tubular member and bicycle seat, to act as a cushion for the bicycle seat. A lock is provided, at the top end of the outer tubular member, whereby the inner and outer tubular members can be locked together to render the spring inoperative, the lock being manually operable and within easy reach of the user riding the bicycle.

3 Claims, 6 Drawing Figures

BICYCLE SEAT SUPPORTING MEANS

FIELD OF THE INVENTION

This invention relates to bicycles and accessories therefor, and more particularly to a bicycle seat supporting means for use with a bicycle of conventional form.

BRIEF DESCRIPTION OF THE PRIOR ART

It has been proposed in the past to provide cushioning means in the form of springs, to a bicycle seat or saddle, to cushion the rider against shocks and impacts and improve the comfort of the ride. Thus it is known to provide spring mounted saddles on top of bicycle frameworks. It has also been proposed to provide spring cushioned mounting posts for inserting in the tubular rear frame member of a bicycle, so as to provide the desired shock absorbing effect for the seat. Examples of such proposals are to be found in U.S. Pat. No. 559,841 Brooks; U.S. Pat. No. 559,291 Brooks; U.S. Pat. No. 658,909 Fraser and U.S. Pat. No. 2,756,071 Riva.

Despite the fact that these proposals are in some cases many years old, apparently no such arrangement for a bicycle seat mounting means has been successfully commercialized. It is believed that one of the factors inhibiting the adoption of such arrangements is the fact that their use and operation tends to add to the effort which the user must expend in order to propel the bicycle. The user must work against the spring tension which is supporting the seat, and this can add an undesirable amount of required effort, particularly for up hill operation.

SUMMARY OF THE INVENTION

It is an object of the present invention to provide a novel bicycle seat supporting means.

It is a further object to provide a novel spring loaded bicycle seat supporting means which can be arranged to cushion the impact transmitted to the bicycle user during normal operation.

The present invention provides a bicycle seat supporting means in which the post to which the seat is mounted is slidable telescopically within another, fixed post, under spring action, to cushion the seat against shocks and impacts, and means are provided for optional locking of the two posts together, to eliminate such spring modified telescope action and remove the cushioning effect, at the option of the user. The locking means is readily accessible to and manually operable by the rider. By this means, the user has the option of riding the bicycle with or without the cushioning effect, so that the user can eliminate the cushioning effect if and when the propelling effort becomes excessive, and reinstate it when desired, e.g. when coasting.

Thus according to the present invention, there is provided a bicycle seat supporting means comprising:

an elongated tubular outer member adapted to be clamped in a bicycle frame member, said outer member having an open upper end;

an elongated inner member slidable within said outer member, the upper end of said inner member protruding through the open upper end of said outer member and adapted to receive a bicycle seat clamped thereto;

a spring acting between the outer member and the inner member to urge against downward movement of the inner member within the outer member;

locking means movable between a first, locking position causing engagement of the outer member and the inner member preventing relative sliding movement therebetween, and a second, unlocking position permitting relative sliding movement therebetween.

DESCRIPTION OF THE PREFERRED EMBODIMENTS

In a preferred embodiment according to the present invention, the locking means of the bicycle seat supporting means comprises an inwardly extending protrusion mounted on the outer member, and adapted to enter and engage an aperture in a side wall of the inner member in its locking position, and clear the inner member in its locking position. The locking means is mounted fixedly on the top end of the outer member, so as to be located within easy reach of the rider, just below the bicycle seat. Suitably, the locking means comprises a circular collar, the inwardly extending protrusion thereof comprising an inturned end of a semicircular, slidable inset portion of said collar, the inset portion being slidable to move the protrusion inwardly and outwardly with respect to the collar.

Preferably also, the spring is a compression coil spring seated at one end against seating formations at the lower end of the outer member, and the inner member includes a downwardly presented formation against which the other end of the spring bears. This downwardly presented formation is also preferably manually adjustable along the length of the inner member, so as to vary the tension in the spring, the manual adjustment means being accessible from the exterior of the bicycle. By such an arrangement, a user can adjust the spring tension so as properly to support the weight of the rider, to botain full benefit of the spring cushioned seat supporting action.

In a most preferred embodiment, the downwardly presented formation of the inner member includes a lower stop means, against the lower surface of which the end of the spring urges, an upwardly extending screw threaded shaft, a nut threadably received on said shaft and manually accessible from the exterior of the bicycle seat supporting means, and a positioning member fixing the position of the nut relative to the top end of the inner member, so that rotation of the nut on the shaft adjusts the position of the lower stop means relative to the top end of the inner member, and adjusts the tension in the spring.

REFERENCE TO THE DRAWINGS

In the drawings, like reference numerals indicate like parts.

DETAILED DESCRIPTION OF THE SPECIFIC PREFERRED EMBODIMENT

Figure 1:
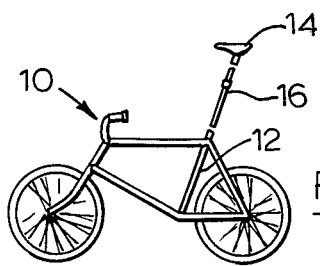
FIG. 1 is a diagrammatic side view of a bicycle with the seat supporting means according to the invention about to be applied to it.

With reference to the drawings, FIG. 1 shows a bicycle 10 having a tubular frame of conventional form, which includes a rear, upwardly extending, inclined tubular element 12. Conventionally, a seat supporting post slides down inside the open top end of the frame element 12, the seat 14 being clamped or bolted to the top of the post. The vertical height of the post within the frame element 12 is adjustable by means of a releasable clamp, so as to adjust the height of the seat 14 to the convenience of the rider.

Figure 2:
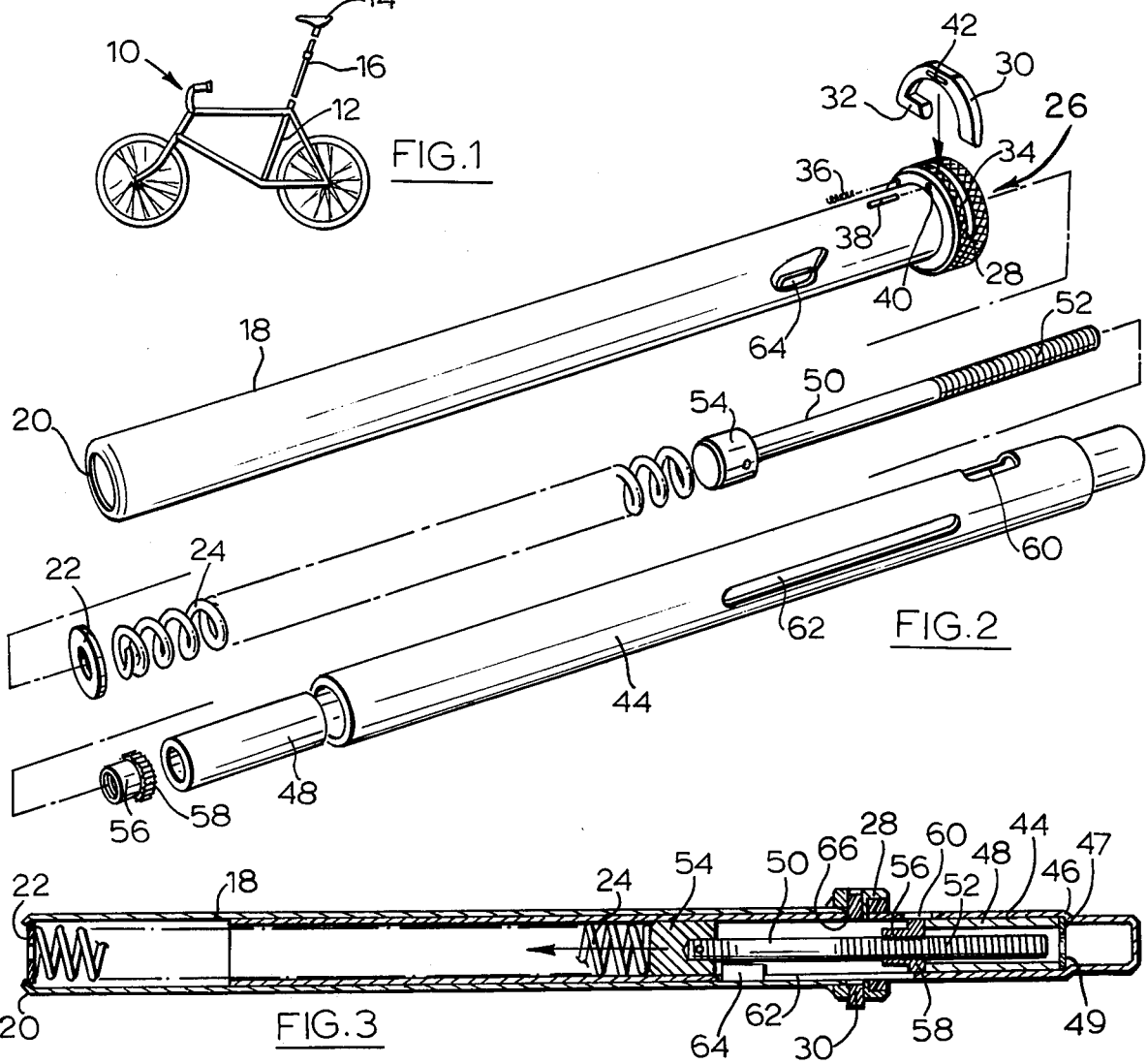
FIG. 2 is an exploded perspective view of the components of the bicycle seat supporting means of the preferred embodiment of the invention.

In the present invention, the conventional seat supporting post is replaced by a seat supporting means 16, insertable in the frame element 12 and adjustable in the frame element 12 and adjustable as to height by means of the same clamping arrangement provided on the conventional bicycle. The component parts of the seat supporting means 16 are shown in detail in FIGS. 2 and 3.

The means 16 comprises an elongated outer tubular member 18, the lower end of which is provided with an inwardly extending lip 20 acting as a constriction. A circular washer 22 is received inside the outer member 18, to rest against the lip 20 and serve as a seat for the lower end of a coil compression spring 24. The upper end 26 of the outer member 18 is open, and is fitted with a locking means in the form of a circular collar 28 welded to the outside of tube 18. Collar 28 is fitted with a semi-circular inset latch 30, one end of which is in turned to provide an inwardly extending protrusion 32. The latch 30 is slidable in a groove 34 in the collar 28, to move the protrusion 32 inwardly and outwardly. A spring 36 mounted axially in the collar 28 bears against the side of latch 28 and guards against vibration and consequent loosening of the latch in use. A pin 38 extends axially through an aperture 40 in the collar, through an elongated slot 42 in the latch 30, to retain it therein and permit relative sliding movement thereof.

The means 16 further includes an elongated tubular inner member 44, slidable within outer member 18, the top end of inner member 44 being of diminished size to receive thereon the seat 14, and presenting downwardly an annular shoulder 46 and an intermediate end wall 47 within the inner member 44. A short inset tube 48 is received inside inner member 44. A washer 49 is located downwardly of shoulder 46, and the top end of tube 48 abuts against washer 49, thus guarding against forcible impacts on the upper wall of tube 44 in the event of a breakage of parts within the tube.

A plunger 50 is provided, effectively consitituing a downwardly presented formation of the inner member 44, to fit inside the upper part of inner member 44, the plunger having an upwardly extending screw threaded shaft 52 and an enlarged stop formation 54 at its lower end. A screw threaded gear wheel 56, having an outer knurled surface formation 58, is threadably received on screw threaded shaft 52. The upper end of shaft 52 extends upwardly into the interior space within inset tube 48, but terminates short of the intermediate end wall 47 of the inner member 44. The gear wheel 56 abuts against the lower end of inset tube 48, and is spring urged into abutment therewith by pressure of spring 24. Access to the knurled surface formation 58 thereof is afforded from the exterior of means 16 through an aperture 60 in the side of inner member 44. By rotation of gear wheel 56, plunger 50 is moved upwardly and downwardly with respect to inner member 44, so as to adjust the tension in spring 24, in relation to the weight of the bicycle rider.

Inner member 44 is provided with a longitudinally extending slot 62 in its side wall, which receives therein an inwardly protruding key formation 64 on the side wall of the outer member 18. The engagement of key formation 64 with the top end of slot 62 limits the upward travel of inner member 44 with respect to outer member 18. The limit of downward travel of inner member 44 with respect to outer member 18 is determined by the compression of spring 24. The engagement of key formation 64 with slot 62 prevents relative rotation between the inner member 44 which is to hold the seat 14, and the outer member 18 which is to be clamped to the bicycle frame.

Figure 4:
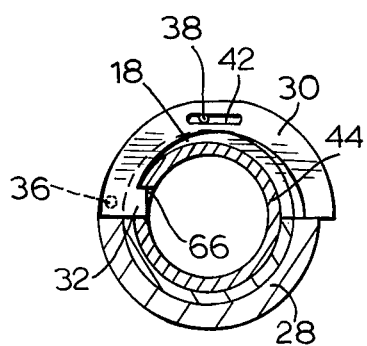
FIG. 4 is a sectional view of the locking means of the embodiment of FIGS. 2 and 3, in the locked position.
Figure 5:
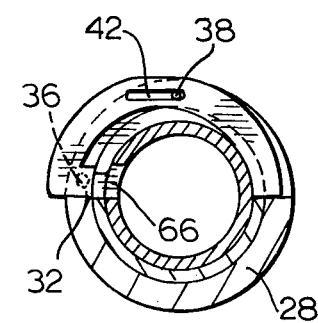
FIG. 5 is a view similar to that of FIG. 4 but showing the locking means in the unlocked position.
Figure 6:
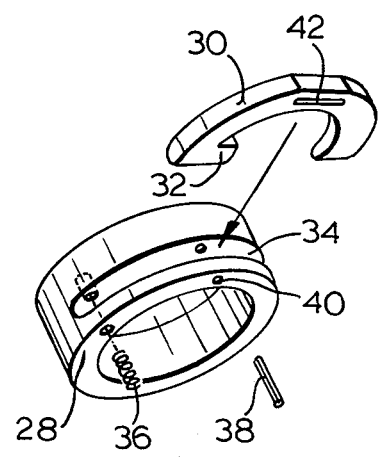
FIG. 6 is an exploded view of the locking means of FIGS. 4 and 5.

Inner member 44 is also provided at its side wall, near its upper end, with a locking aperture 66. The locking aperture is positioned so as to be in alignment with protrusion 32 of latch 30 on the fixed collar 28, when spring 24 is relaxed, i.e. when inner member 44 is at an upper position with respect to outer member 18. Then, latch 30 can be slid in collar 28 to insert protrusion 32 into or remove protrusion 32 out of aperture 66, to lock and unlock inner member 44 and outer member 18 together. The details of the collar 28 and the latch 30 are shown in FIGS. 4, 5 and 6. In FIG. 4, the latch 30 is pushed to the right so that protrusion 32 is received in aperture 66 of inner member 44, to lock the collar 28 (which is fixedly secured to outer member 18 as by welding) in fixed position to the inner member, thereby preventing relative sliding movement between inner member 44 and outer member 18 and hence rendering spring 24 inoperative. In FIG. 5, latch 30 is pushed to the left, so that protrusion 32 is clear of aperture 66, and the inner and outer members can slide with respect to one another, as modified and cushioned by compression spring 24.

Figure 3:
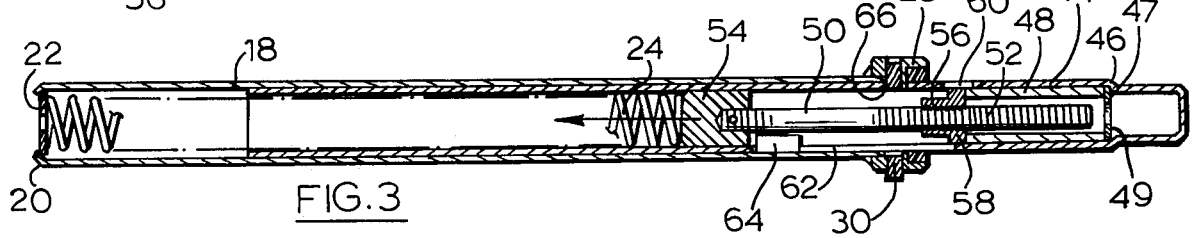
FIG. 3 is a longitudinal cross sectional view of the assembled components of the bicycle seat supporting means of FIG. 2.

The installation and operation of the bicycle seat supporting means illustrated will be apparent from the foregoing description and accompanying drawings. The means can be applied readily to an existing bicycle, by unclamping and removing the conventional seat post, removing the seat therefrom and clamping it to the top end of inner member 44. The supporting means assembled as shown in FIG. 3 and with attached seat is then inserted into bicycle frame member 12, and the height of the seat adjusted to the user's preference by appropriate clamping of the standard clamp on the bicycle frame to the outer surface of the outer member 18, with collar 28 above the top end of frame member 12. The user turns gear wheel 60 to adjust the tension in the compression spring 24, to support the user's weight when sitting on the seat 14.

When riding the bicycle, the user can readily reach below the seat 14 to locate and operate latch 30, to render the spring loaded cushioning of the seat 14 operative or inoperative, at the user's wish. To move the latch 30 to the locking position, the user must first allow spring 24 to expand and inner member 44 to rise to its full extent in outer member 18, so that latch 30 aligns with aperture 66 in inner member 44 and can be pushed into engagement therewith to cause locking. Spring 36 on collar 28 helps retain latch 30 in the present condition. The latch can be pushed manually to the unlocking position of FIG. 5 when the user's weight is taken off seat 14. Abutment washer 49 in the inner member 44 serves to protect against breakage of parts in the even of a breakage of spring 24 when under compression.

Once inner member 44 and its associated component parts such as plunger 50, and compression spring 24, have been assembled inside out member 18, there is no cause for disassembly thereof, and the assembly can therefore be made permanent. The relative moving parts can be prelubricated prior to assembly, e.g. by greasing. Access to gear wheel 58 for adjustment of the spring tension is required infrequently, and so is normally accomplished by screw driver pressure, inserted through aperture 60.

The bicycle seat supporing means according to the invention is readily manufactured and sold as an accessory, for assembly into existing bicycles. Alternatively, of course, it can be built into new bicycles at the manufacturing stage, if desired.

It will be understood that the embodiment of the invention illustrated and described in detail herein is illustrative only, and is not be construed as limiting. The scope of the present invention is limited only by the appended claims.

We claim:

1. A bicycle seat supporting means comprising:
   an elongated tubular outer member adapted to be clamped in a bicycle frame member, said outer member having an open upper end and a lower end provided with a spring seating formation;
   an elongated tubular inner member slidable within the outer member, the upper end of said inner member protruding through the open upper end of said outer member and adapted to receive a bicycle seat clamped thereto, the inner member including a downwardly presented formation disposed interiorly thereof and adjustable along the length thereof.
   a compression spring seated at one end against the spring seating formation of said outer member and at the other end against the downwardly presented formation of said inner member, said spring urging against downward movement of the inner member within the outer member;
   locking means mounted on the upper portion of said outer member and including a laterally inwardly extending protrusion manually movable between a first, locking position in which it enters and engages an aperture in a side wall of said inner member to prevent relative sliding movement between the inner member and the outer member, and a second, unlocking position in which the protrusion clears the inner member permitting said relative sliding movement;
   said inner member including adjusting means for adjusting the position of the downwardly presented formation therein, to vary the tension in the compression spring, said adjustment means including:
   an upwardly extending screw threaded shaft fixed secured at its lower end to said downwardly presented formation, a nut threadably received on said shaft, and a tubular positioning member positioned between said nut and the upper end of said inner member for fixing the axial position of the nut in the inner member and allowing said shaft to axially pass therethrough, said nut registering with an aperture in the side wall of the inner member at a location beyond the upper end of the outer member, so that the nut is accessible from the exterior of the assembly for turning purposes relative to the screw threaded shaft, to adjust the tension in the spring.

2. The bicycle seat supporting means of claim 1 wherein said locking means comprises a circular collar fixedly secured to the upper extremity of said outer member, the inwardly extending protrusion thereof comprising an inturned end of a semi-circular, slidable inset portion of said collar, said inset portion being slidable to move said protrusion inwardly and outwardly with respect to said collar.

3. The bicycle seat supporting means of claim 1 including means for limiting rotation of the inner member with respect to the outer member, said means comprising an inwardly extending protrusion on the inner surface of the outer member and an elongated slot in the inner member in which said protrusion is received.

* * * * *